United States Patent
Reynes et al.

(10) Patent No.: US 9,499,258 B2
(45) Date of Patent: Nov. 22, 2016

(54) DEVICE FOR CONCOMITANT OPENING OR CLOSING OF TWO FLAPS OF A LANDING GEAR DOOR

(71) Applicant: AIRBUS OPERATIONS S.A.S., Toulouse (FR)

(72) Inventors: Didier Reynes, Toulouse (FR); Jerome Phalippou, Tournefeuille (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 57 days.

(21) Appl. No.: 14/567,527

(22) Filed: Dec. 11, 2014

(65) Prior Publication Data

US 2015/0166173 A1 Jun. 18, 2015

(30) Foreign Application Priority Data

Dec. 16, 2013 (FR) ...................... 13 62712

(51) Int. Cl.
*B64C 25/20* (2006.01)
*B64C 25/16* (2006.01)

(52) U.S. Cl.
CPC ............... *B64C 25/20* (2013.01); *B64C 25/16* (2013.01); *Y10T 74/18888* (2015.01)

(58) Field of Classification Search
CPC ... B64C 25/16; B64C 1/1407; B64C 1/1461; B64C 1/14; B64C 25/20; B65D 1/06
USPC .......... 49/104, 107, 108, 109, 110, 111, 112, 49/113, 116, 118, 122
See application file for complete search history.

(56) References Cited

U.S. PATENT DOCUMENTS

| | | | | |
|---|---|---|---|---|
| 2,222,975 | A * | 11/1940 | Brown | B64C 25/12 244/102 R |
| 2,397,516 | A | 4/1946 | Stewart | |
| 2,406,710 | A * | 8/1946 | Ramey | B64C 25/16 244/102 R |

(Continued)

FOREIGN PATENT DOCUMENTS

| | | |
|---|---|---|
| EP | 1129939 A2 | 9/2001 |
| FR | 2911321 A1 | 7/2008 |
| GB | 784929 A | 10/1957 |

OTHER PUBLICATIONS

Merriam-Webster.com, Definition of concomitant, http://www.merriam-webster.com/dictionary/concomitant, accessed Mar. 30, 2016.*

(Continued)

*Primary Examiner* — Tien Dinh
*Assistant Examiner* — Alexander V Giczy
(74) *Attorney, Agent, or Firm* — Lorenz & Kopf LLP

(57) ABSTRACT

A device for concomitant opening or closing of two flaps of a door of an aircraft retractable landing gear. The device comprises a single actuating means for the opening or the closing of the two flaps under the effect of its extension or of its retraction. The actuating means comprises a first end linked to the structure of the aircraft, and a movable part. The device comprises a swinging arm comprising a first end linked by a pivot to the structure, and a second end linked to the movable part of the actuating means by a link having a degree of rotational freedom about an axis parallel to the axis of the pivot. The second end of the swinging arm is furthermore respectively linked to a first tie rod linked to a first of the two flaps, and to a second tie rod linked to a second of the two flaps.

8 Claims, 4 Drawing Sheets

(56) References Cited

U.S. PATENT DOCUMENTS

| | | | | |
|---|---|---|---|---|
| 2,604,281 | A | 8/1948 | Cooke et al. | |
| 2,452,251 | A * | 10/1948 | Martin | B64C 25/16 244/102 R |
| 2,677,515 | A * | 5/1954 | Perry | B64C 25/12 244/102 SL |
| 2,692,097 | A * | 10/1954 | Payne, Jr. | B64C 25/14 244/102 R |
| 2,750,929 | A * | 6/1956 | Bronson | B64D 1/04 137/505.13 |
| 5,482,228 | A * | 1/1996 | Hoshino | B64C 25/50 244/102 A |
| 6,345,786 | B1 * | 2/2002 | Sakurai | B64C 25/16 244/100 R |
| 8,167,241 | B2 * | 5/2012 | Reynes | B64C 25/16 244/102 A |
| 2005/0103937 | A1 * | 5/2005 | Briancourt | B64C 25/16 244/129.5 |
| 2005/0211849 | A1 * | 9/2005 | Rouyre | B64C 25/16 244/129.4 |
| 2012/0168562 | A1 * | 7/2012 | Alonzo | B64C 25/16 244/102 A |
| 2013/0099053 | A1 * | 4/2013 | Barmichev | B64C 1/10 244/102 R |

OTHER PUBLICATIONS

SketchUcation.com, "What is the difference between ball joints and universals?", Dec. 2008; http://sketchucation.com/forums/viewtopic.php?f=61&t=14994 accessed on Apr. 1, 2016.*

French Patent Office, French Search Report for French Patent Application 1362712 mailed Oct. 20, 2014.

* cited by examiner

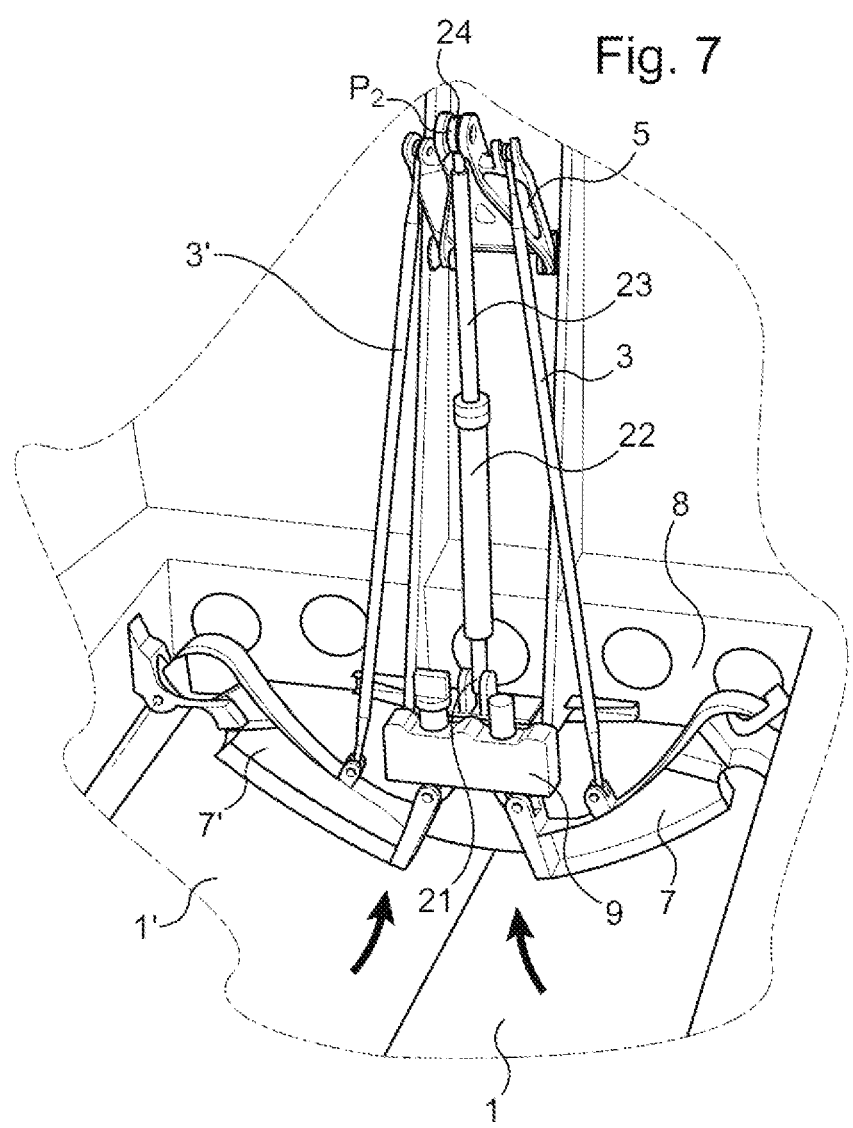

DEVICE FOR CONCOMITANT OPENING OR CLOSING OF TWO FLAPS OF A LANDING GEAR DOOR

CROSS-REFERENCE TO RELATED APPLICATION

This application claims priority French Patent Application No. 1362712, filed Dec. 16, 2013, which is incorporated herein by reference in its entirety.

TECHNICAL FIELD

Embodiments described herein relate generally to a device for concomitant opening or closing of two flaps of an aircraft retractable landing gear. More particularly, embodiments described herein relate to a device that can be employed to open or close a door of a landing gear comprising two flaps, as commonly employed for the front landing gear of an aircraft.

BACKGROUND

The retractable landing gears of airplanes are conventionally retractable into a volume that can be closed in flight by one or more flaps that form a door. It is known to actuate the flaps, in order to open or close them, with the aid of actuating means such as hydraulic cylinders. One cylinder per flap can be provided.

However, in order to open two flaps, in particular two constituent flaps of a two-flap door, as the number of certain parts involved is doubled; i.e. two cylinders are necessary, as well as two associated opening and closing mechanisms. This results in an increased mechanical complexity and higher mass. Furthermore, since each cylinder is typically linked to the structure of the aircraft on each side of the structure, more or less directly below the tipping axis of each of the flaps, the lever arm between the application point of a force by the cylinder and the rotation axis of the flap is short. This requires the use of cylinders that are and are thus heavy, creating significant forces on the structure of the aircraft.

Two-flap doors that are actuated by a single cylinder are also known. This is commonly the case for landing gear doors that are located at the nose of the airplane. In known devices comprising a single cylinder for actuating the door, two tie rods are linked to the flaps and are connected together at a pivot point. This pivot point is generally located at the end of a transverse arm. The other end of the transverse arm is connected to the structure of the aircraft. The raising or lowering of the pivot point, under the effect of a cylinder linked to the transverse arm on one side and to the structure of the aircraft on the other side, causes the flaps of the door to open or close. In the known devices, two zones are created for introducing forces into the structure of the aircraft, firstly in the region of a link between the cylinder and the structure, and secondly at the link, typically a pivot link, between the transverse arm and the structure. The introduction of transverse forces into an aircraft is not desirable, in particular if these are not absorbed directly by a central beam of the aircraft.

The known devices are bulky, have complex dynamics, and/or bring about absorption of forces at least at two points on the structure of the aircraft, which have to be reinforced.

The aim of the present embodiments described herein is to provide a device for opening or closing two flaps of a landing gear door of an aircraft, which is optimized with regard to its makeup and the forces transmitted to the structure of the aircraft.

To this end, provision is made, according to a first aspect of an embodiment, of a device for the concomitant opening or closing of two flaps of a door of an aircraft retractable landing gear, the two flaps pivoting about two approximately parallel longitudinal pivot axes that define a closing plane of the flaps. The device comprises a single actuating means that is able to open and close the flaps by modification of its length, the actuating means comprising a fixed end linked at a force-absorbing point to the structure of the aircraft, the actuating means furthermore comprising a movable part. The device further comprises a swinging arm having a first end linked by a first link to the structure, and a second end linked by a second link to the movable part of the actuating means, the first link being a pivot and the second link having a degree of freedom about an axis parallel to the axis of the pivot, the device being configured such that the second end of the swinging arm moves away from or toward the closing plane PF of the flaps during the extension or the retraction of the actuating means. The second end of the swinging arm is respectively linked to a first tie rod linked to a first of the two flaps, and to a second tie rod linked to a second of the two flaps.

Such a device has simple dynamics and can be compact and lightweight. It also makes it possible to transfer all or almost all of the mechanical forces generated during the opening or closing of a landing gear door to a single point for absorption of forces by the structure of the aircraft in question, namely the linking point between the fixed end of the actuating means and the structure to which it is linked.

SUMMARY

In a first embodiment, the movable part of the actuating means may advantageously be linked to the swinging arm by a universal joint. Depending on the actuating means in question, this makes it possible to link the movable part to the tie rods at a point other than the end of the movable part, this making it possible to employ tie rods that are shorter and thus lighter and/or stronger.

In a second embodiment, the movable part of the actuating means comprises a movable end linked to the swinging arm. A pivot link can be provided to this end. This second embodiment allows the use of a simple link between the swinging arm and the actuating means, but requires the use of tie rods that are longer than in the first embodiment. The actuating means may be a cylinder. When the link between the swinging arm and the actuating means is realized by a universal joint, the body of the cylinder advantageously forms the movable part of the actuating means.

The device is advantageously symmetrical on either side of a longitudinal plane orthogonal to the closing plane. This allows good distribution of the forces into the device and also avoids the generation and the transmission of transverse forces into the structure of an aircraft equipped with the device.

Each tie rod may be linked to a flap at a distance from its pivot axis. Thus, the moving of the second end of the swinging arm toward or away from the closing plane of the flaps causes the flap to pivot. Advantageously, each tie rod is linked to a flap by a ball joint link. In one embodiment, each flap comprises a panel and an actuating part rigidly linked to the panel, the tie rod being linked to the actuating part.

In a first variant of the embodiment, an extension of the actuating means causes the flaps to close. In a second variant of the embodiment, an extension of the actuating means causes the flaps to open.

According to a second aspect, an embodiment relates to an aircraft comprising a device for concomitant opening or closing of two flaps of a landing gear that the aircraft comprises, in accordance with the first aspect of an embodiment.

In such an aircraft, the actuating means is advantageously linked to the structure of the aircraft such that the vertical component of the forces generated during the opening or closing of the door is absorbed entirely at the force-absorbing point by the structure. The force-absorbing point may be located on a structural cross-beam of the fuselage. The force-absorbing point may be located in the region of a locking unit of the door.

BRIEF DESCRIPTION OF THE DRAWINGS

Further particular features and advantages of the embodiment will become further apparent from the following description taken in conjunction with the appended drawings, which are given by way of nonlimiting example and wherein:

FIG. 7 schematically shows the same view of the device illustrated in FIG. 6, with the door closed.

DETAILED DESCRIPTION

Figure 1:
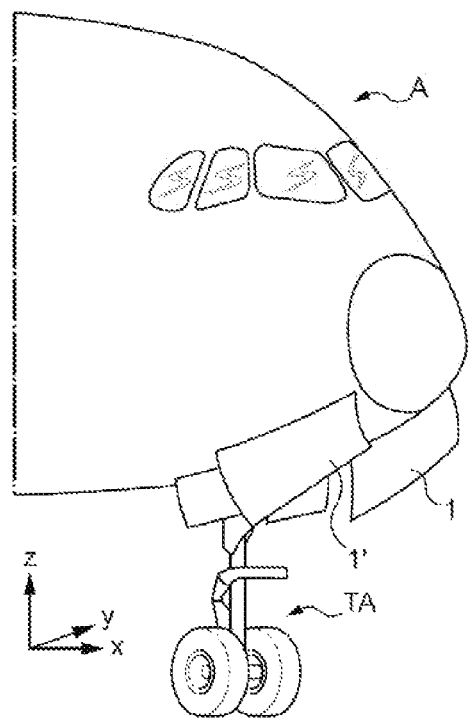
FIG. 1 schematically shows a perspective view of the front part of an aircraft comprising a retractable landing gear.
Figure 3:
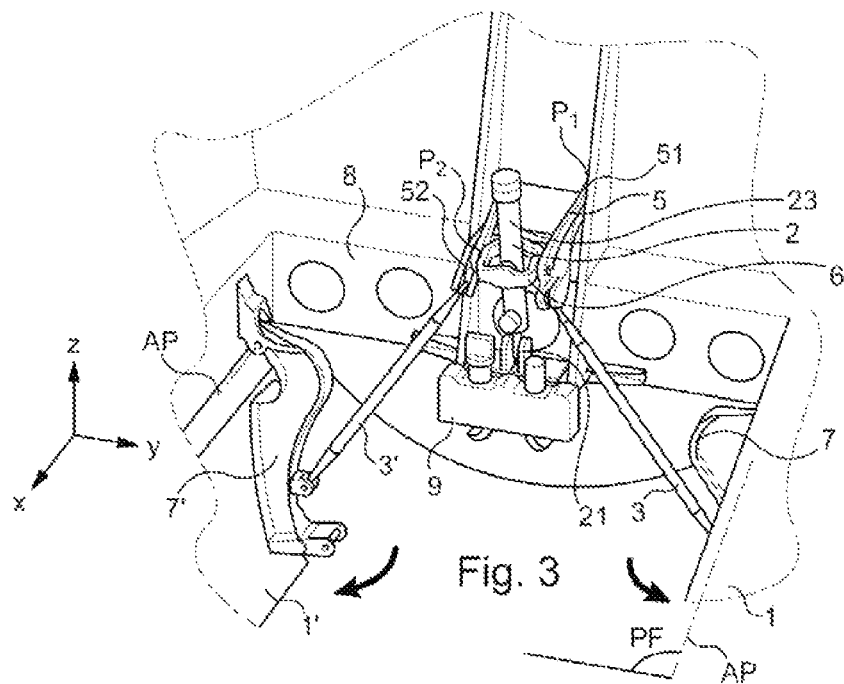
FIG. 3 schematically shows a device for opening and closing a door of an aircraft retractable landing gear and the immediate environment thereof according to a first embodiment, with the door open.

In order to make them easier to understand, FIG. 1 and FIG. 3 show an orthogonal reference frame (x, y, z) in which the axis (x) corresponds to a direction parallel to the main longitudinal axis of the aircraft, typically an elongate fuselage of an aircraft, the axis corresponding to an axis between the front (nose) and rear (tail) of the aircraft, and being generally more or less horizontal when the aircraft is on the ground; the axis (y) is a transverse axis, orthogonal to the axis (x), which is generally also horizontal and typically parallel to the plane of the wings of the aircraft; and the axis (z), which is orthogonal to (x) and (y), is thus generally more or less vertical.

An aircraft A, in this case an airplane, generally comprises one or more retractable landing gears TA. A landing gear, typically the landing gear equipping a front part of an aircraft, as shown in FIG. 1, is retracted into a volume closed by a door during flight. The door comprises two flaps 1 and 1' that are opened and closed under the action of actuating means. The actuating means are typically cylinders. The door can also comprise additional flaps that are actuated by the deployment or retraction of the gear.

The most commonly employed systems for opening and closing doors that are actuated by actuating means comprise one actuating cylinder per flap 1 and 1'. These devices are generally heavy, bulky, and do not mechanically ensure concomitant opening of the flaps 1 and 1'.

Figure 2:
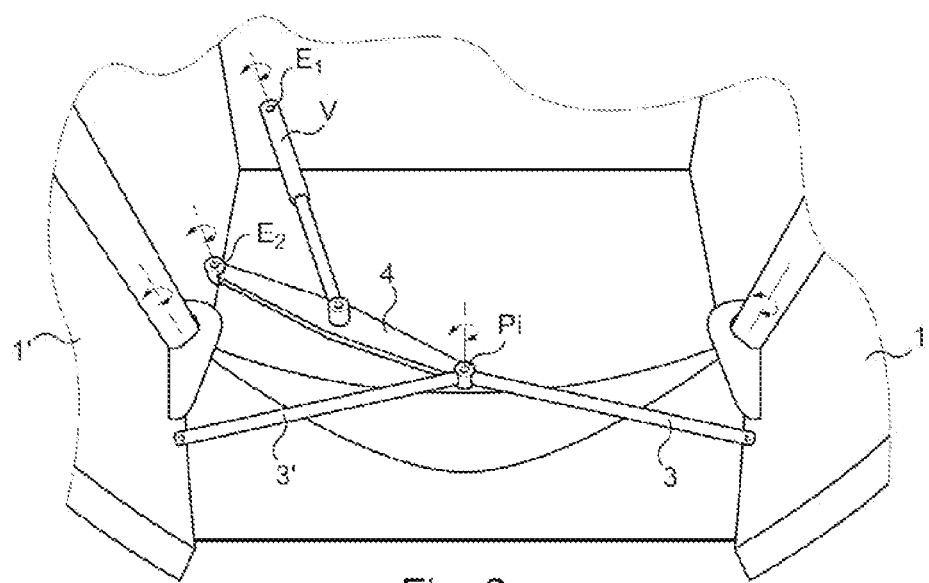
FIG. 2 schematically shows a perspective view of a device for opening and closing a door of an aircraft retractable landing gear and the immediate environment thereof, as known in the prior art.

Devices employing a single cylinder V are also known. FIG. 2 schematically shows such a device for opening and closing a door of an aircraft retractable landing gear and the immediate environment thereof. In the device shown in FIG. 2, two tie rods 3 and 3' are respectively linked to the flaps 1 and 1' and are connected together at a pivot point Pi. The pivot point Pi is located at the end of a transverse arm 4. The other end of the transverse arm 4 is connected to the structure of the aircraft. The arm is referred to as transverse since it extends generally parallel to the axis (y). The raising or lowering of the pivot point Pi under the effect of the cylinder V linked to the transverse arm 4 on one side and to the structure of the aircraft on the other side causes the flaps 1 and 1' of the door to open or close. However, such a system is heavy and voluminous and also introduces transverse forces (in a direction parallel to the axis (y)) into the structure of the aircraft at two force-absorbing points E2 and E2. However, the structure of an aircraft is generally not very well suited to being subjected to transverse forces. The linking zones between the structure of the aircraft and the cylinder 3 on the one hand and the transverse arm 4 on the other hand must therefore generally be reinforced, thereby making the aircraft heavier.

Figure 4:
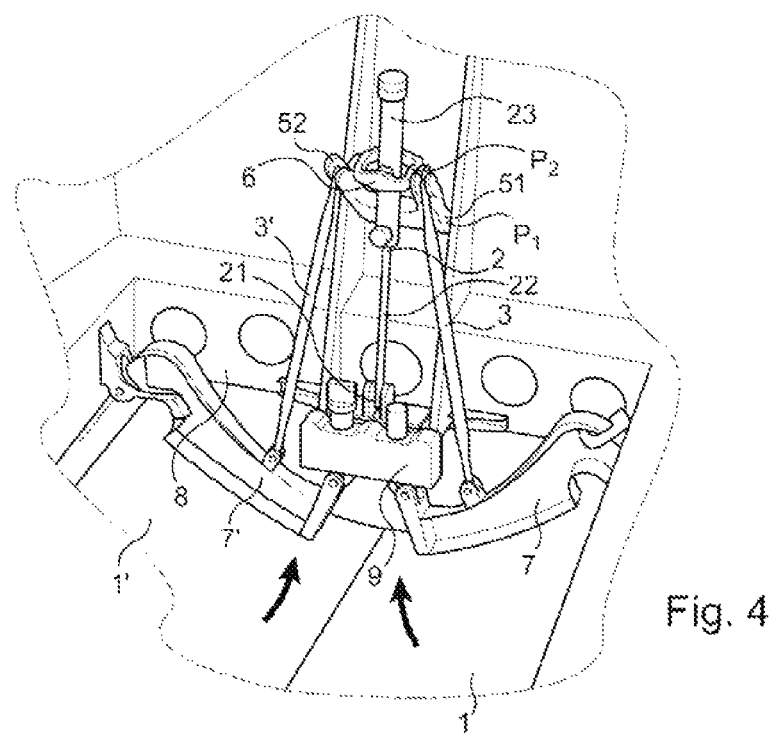
FIG. 4 schematically shows the same view of the device illustrated in FIG. 3, with the door closed.

A device for concomitant opening or closing of two flaps 1, 1' of an aircraft retractable landing gear according to a first embodiment is shown in FIGS. 3 and 4. In FIG. 3, the door of the landing gear is open. In FIG. 4, the door of the landing gear is closed. The landing gear is not shown.

The flaps 1 and 1' pivot about two approximately parallel longitudinal pivot axes (AP) that define a closing plane (PF) of the flaps. The pivot axes (AP) are thus approximately parallel to the axis (x). The plane (PF) is approximately parallel to the plane (x, y).

The device comprises a single actuating means 2, in this case a hydraulic cylinder. The actuating means is of the variable-length type, a modification of its length causing the simultaneous opening or closing of the flaps 1 and 1'. An end referred to as a fixed end 21 of the actuating means is linked to the structure of the aircraft. The fixed end can in particular be fixed in the region of a locking unit 9 of the door. The forces can be absorbed by a structural cross-beam 8 of the aircraft. The fixed end 21 is referred to as fixed since its linking point with the structure of the aircraft is fixed. However, the link between the fixed end 21 and the structure of the aircraft can be of the pivot or ball joint type. The fixed end 21 can be the end of a fixed part 22 of the actuating means 2. The actuating means 2 also comprises a movable part 23. The notion of movable is understood with respect to the structure of the aircraft.

In the embodiment shown here, the single actuating means 2 is a cylinder which comprises a rod and a body. The fixed end 21 is advantageously the end of the rod. The rod constitutes the fixed part 22. The body of the cylinder constitutes the movable part 23.

The device comprises a swinging arm 5. The swinging arm 5 comprises a first end 51 linked by a first link to the structure, and a second end 52 linked by a second link to the movable part 23 of the actuating means 2. The first link is a pivot P1. The second link has a degree of freedom about an axis parallel to the axis of the pivot P1. The second link can thus comprise a second pivot P2. The device is configured such that the second end 52 of the swinging arm 5 moves away from or toward the closing plane PF of the flaps 1 and 1' during the extension or retraction of the actuating means 2. For this purpose, the actuating means is advantageously oriented such that its movable part moves approximately orthogonally to the closing plane PF of the flaps, that is to say approximately orthogonally to the plane (x, y), or parallel to the axis (z). It remains substantially oriented in this way during its extension and its retraction. This does not preclude any possible slight tipping of the actuating means 2 and/or of its movable part 23 about the axis (z). The swinging arm 5 is advantageously movable in a longitudinal plane of symmetry of the device. This plane is parallel to the plane (x, z).

In the embodiment shown here, the guidance of the movable part 23, that is to say of the cylinder body, is carried out by the swinging arm 5 connecting the structure to the movable part 23 of the actuating means 2.

This guidance is obtained by the fact that, as mentioned above, in the embodiment shown here, the swinging arm 5 is pivot-linked to the structure by a pivot link P1. The swinging arm 5 is linked to the movable part 23 by a second link comprising a pivot P2 of axis parallel to the axis of the pivot link P1. Advantageously, the axes of the pivot links P1, P2 are parallel to the axis (y). The swinging arm 5 is advantageously approximately parallel to the plane (x, y) or to the closing plane PF of the flaps 1 and 1' when the actuating means is half-way between a retracted position and an extended position. Thus, during the extension or the retraction of the actuating means, that is to say while the movable part 23 is moving, the second end, linked to the movable part 23, of the swinging arm guides the movable part 23 substantially in vertical translation. Strictly speaking, the actuating means 2 tips slightly in a plane parallel to the plane (x, z) during its extension or its retraction. The movable part 23 describes a movement made up of translation and rotation in this plane, with a component mainly along an axis parallel to the axis (z), orthogonal to the closing plane of the first and second flaps 1 and 1'.

Since the second end of the swinging arm is otherwise linked respectively to a first tie rod linked to a first of the two flaps and to a second tie rod linked to a second of the two flaps, the swinging arm 5 thus ensures both the connection between the movable part 23 and the first and second tie rods 3 and 3', and the link between the movable part and the structure of the aircraft. Nevertheless, in the configuration of the embodiment that is shown here, all or virtually all of the forces generated during the opening or the closing of the flaps 1 and 1' are absorbed at the link between the fixed part 22 and the structure, in this case at the fixed end 21 of the actuating means 2.

Figure 5:
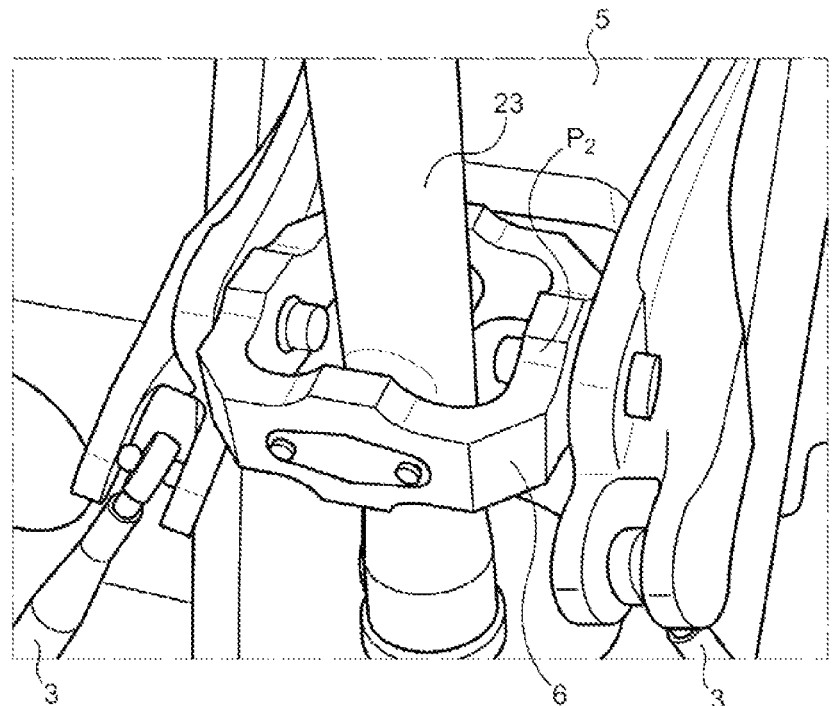
FIG. 5 is a detail view of the device presented in FIGS. 3 and 4.

As shown in FIG. 5, the link between the swinging arm 5 and the movable part 23 is realized with the aid of a universal joint 6. The use of a universal joint 6 has a number of advantages. It allows the pivoting link between the swinging arm 5 and the movable part 23 of the actuating means 2. The universal joint 6 typically allows the link between a cylinder body and the swinging arm 5 at a location other than the end of said cylinder body. This makes it possible to reduce the size, and thus the mass, of the tie rods 3 and 3' and to lower the position of the swinging arm in the device.

The tie rods 3 and 3' are respectively linked to the flaps 1 and 1' at a distance from their respective pivot axis (AP). Thus, the movement of the movable part and of the second end of the swinging arm with respect to the closing plane (PF) of the flaps 1 and 1' during the extension or retraction of the actuating means 2 causes the flaps 1 and 1' to pivot and thus to open or close.

In the variant of the embodiment that is shown, the flaps 1 and 1' each comprise a panel and an actuating part 7 and 7', respectively, rigidly linked to the panel. Each tie rod 3 and 3' is linked to an actuating part 7 and 7'. The link is a ball joint link. The actuating part 7 makes it possible to define the position of the panel of the flap 1 with respect to the pivot axis (AP) of the flap, on the one hand, and of the application point of the movement by the tie rod 3 and 3', on the other hand. This makes it possible to impress on the panels a rotational movement while they open and close.

Figure 6:
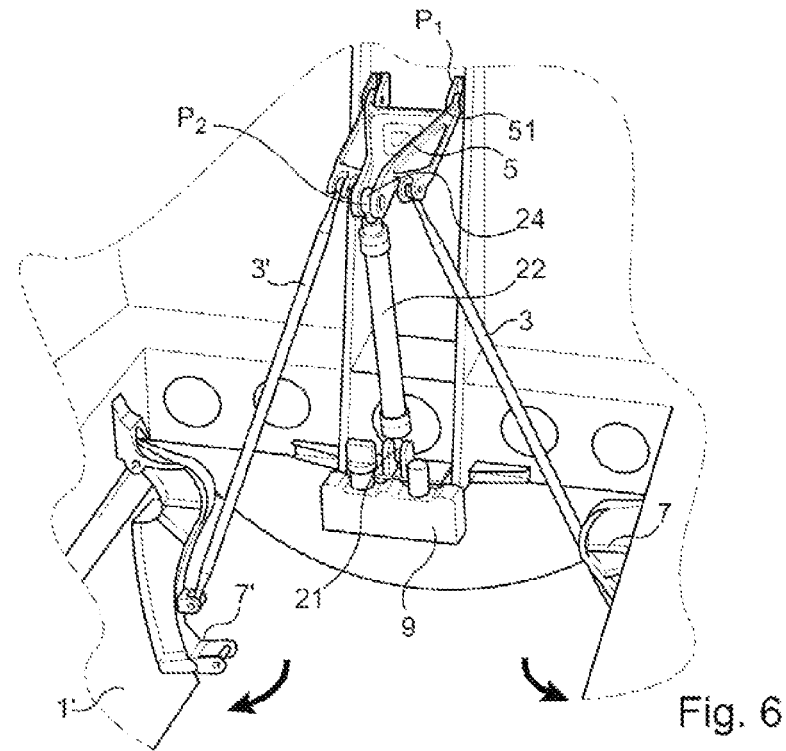
FIG. 6 is a view similar to the one in FIGS. 3 and 4 of a device for opening and closing a door of an aircraft retractable landing gear and the immediate environment thereof according to a second embodiment, with the door open.

A device for concomitant opening or closing of two flaps 1 and 1' of an aircraft retractable landing gear according to a second embodiment is shown in FIGS. 6 and 7. In FIG. 6, the door of the landing gear is open. In FIG. 7, the door of the landing gear is closed. The landing gear is not shown.

The second embodiment shown here differs from the first in particular by the fact that the swinging arm 5 is linked to the movable end 24 of the movable part 23 of the actuating means 2 by a pivot P2 of an axis parallel to the axis of the pivot link P1.

In the example illustrated here, and in contrast to the example shown to illustrate the first embodiment, the movable part 23 of the actuating means 2 is the rod of a cylinder, while its fixed part 22 is the body of said cylinder. In terms of operation, the mounting of the cylinder one way or the other is unimportant, since its extension causes the movement of the doors. Nevertheless, the fact that the fixed end 21 is the end of the body of the cylinder facilitates the hydraulic supply of the cylinder.

This embodiment simplifies the link between the actuating means 2 and the swinging arm 5. Nevertheless, it requires the use of tie rods 3 and 3' having a length greater than a device corresponding to the first embodiment described with reference to FIGS. 3 and 4.

In the first and second embodiments that are shown, the extension of the actuating means 2 causes the flaps to close. This is particularly advantageous when the actuating means 2 is a cylinder since this makes it possible to benefit from the maximum force of the cylinder during the closure of the flaps. Specifically, the section for application of the hydraulic pressure afforded by the piston of a double-acting cylinder is greater in extension than in retraction of the cylinder.

Nevertheless, in another embodiment, the device may comprise an actuating means, the retraction of which causes the flaps 1 and 1' to close, without departing from the scope of the embodiment. Typically, the actuating means could be linked to the structure at a distance from the closing plane PF.

The FIGS. illustrate by way of example a nonlimiting embodiment. Further embodiments may be envisioned. In particular, the actuating means 2 may be of any other type having length modification, for example, other than the cylinder illustrated, a screw pusher.

The embodiment thus developed allows the concomitant opening of the flaps of a landing gear of an aircraft. It applies in particular to airplanes. It is very particularly suitable for front landing gears of aircraft. Concomitant opening is obtained with the aid of a single actuating means and ensured by way of a mechanical link between the flaps of the equipped door. The device developed is lightweight and has simple dynamics. It also makes it possible for all or virtually all of the forces generated by the opening or the closing of the flaps to be absorbed at a single point on the structure of the equipped aircraft.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A device for concomitant opening or closing of two flaps of a door of an aircraft retractable landing gear, the two flaps pivoting about two approximately parallel longitudinal pivot axes that define a closing plane of the two flaps, the device comprising:
   a single actuating means having a length, that is able to open and close the two flaps by modification of the length, the actuating means comprising a fixed end linked at a force-absorbing point to a structure of the aircraft, the actuating means furthermore comprising a movable part that moves substantially orthogonally to the closing plane of the two flaps; and
   a swinging arm comprising a first end pivotably linked to the structure of the aircraft, and a second end opposite the first end and pivotably linked by a second link to the movable part of the actuating means, the first end pivotably linked about an arm pivot axis and the second link having a degree of rotational freedom about an axis parallel to the arm pivot axis, the device being configured such that the second end of the swinging arm moves away from the closing plane of the two flaps during the extension of the actuating means to close the two flaps, and such that the second end of the swinging arm moves toward the closing plane of the two flaps during retraction of the actuating means to open the two flaps, the second end of the swinging arm furthermore being respectively linked to a first tie rod linked to a first of the two flaps, and to a second tie rod linked to a second of the two flaps.

2. The device of claim 1, wherein the movable part of the actuating means is linked to the swinging arm by a universal joint.

3. The device according to claim 1, wherein the movable part of the actuating means comprises a movable end linked to the swinging arm.

4. The device of claim 3, wherein the actuating means is a cylinder.

5. The device of claim 4, wherein the device is symmetrical about either side of a longitudinal plane orthogonal to the closing plane.

6. The device of claim 5, wherein each tie rod is linked to a respective one of the two flaps at a distance from the pivot axis of the respective one of the two flaps.

7. The device of claim 6, wherein each tie rod is linked to a respective one of the two flaps by a ball joint link.

8. The device of claim 7, wherein each flap comprises a panel and an actuating part rigidly linked to the panel, a respective one of the first tie rod or the second tie rod being linked to the actuating part.

* * * * *